US012668673B2

(12) United States Patent
Wang et al.

(10) Patent No.: US 12,668,673 B2
(45) Date of Patent: Jun. 30, 2026

(54) GLASS FIBER COMPOSITE

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Georg Grestenberger, Linz (AT)

(73) Assignee: Borealis AG, Vienna (AT)

( * ) Notice: Subject to any disclaimer, the term of this patent is extended or adjusted under 35 U.S.C. 154(b) by 592 days.

(21) Appl. No.: 17/925,045

(22) PCT Filed: May 17, 2021

(86) PCT No.: PCT/EP2021/062996
§ 371 (c)(1),
(2) Date: Nov. 14, 2022

(87) PCT Pub. No.: WO2021/233828
PCT Pub. Date: Nov. 25, 2021

(65) Prior Publication Data
US 2023/0183431 A1 Jun. 15, 2023

(30) Foreign Application Priority Data
May 22, 2020 (EP) .................................... 20176022

(51) Int. Cl.

| | |
|---|---|
| ***C08J 5/04*** | (2006.01) |
| ***C08F 4/6592*** | (2006.01) |
| ***C08F 10/06*** | (2006.01) |
| ***C08L 23/12*** | (2006.01) |

(52) U.S. Cl.
CPC ........... *C08J 5/043* (2013.01); *C08F 4/65927* (2013.01); *C08F 10/06* (2013.01); *C08L 23/12* (2013.01); *C08J 2323/12* (2013.01)

(58) Field of Classification Search
CPC .... C08J 5/043; C08J 2323/12; C08F 4/65927; C08F 10/06; C08F 4/6465; C08F 110/06; C08F 210/06; C08F 210/16; C08L 23/12; C08L 2205/08; C08L 2205/16; C08L 2314/06; C08L 23/26; C08L 51/06; C08K 7/14; C08K 2201/003; C08K 2201/004
See application file for complete search history.

(56) References Cited

U.S. PATENT DOCUMENTS

| | | | | |
|---|---|---|---|---|
| 7,867,588 B2 | 1/2011 | Harris et al. | | |
| 2011/0178229 A1* | 7/2011 | Goda | C08J 5/04 | 524/562 |
| 2014/0221584 A1* | 8/2014 | Hafner | C07C 41/01 | 556/11 |
| 2017/0166711 A1* | 6/2017 | Boragno | C08L 51/06 | |
| 2018/0265693 A1* | 9/2018 | Jerabek | C08L 51/06 | |
| 2021/0017307 A1* | 1/2021 | Izmer | C07F 17/00 | |

FOREIGN PATENT DOCUMENTS

| | | | |
|---|---|---|---|
| CN | 107406642 | A | 11/2017 |
| EA | 31496 | B1 | 1/2019 |
| EP | 0572028 | B1 | 7/1997 |
| EP | 0887379 | B1 | 12/2004 |
| EP | 2345689 | A1 | 7/2011 |
| EP | 2308923 | B1 | 5/2012 |
| JP | 2008179784 | A | 8/2008 |
| JP | 2009114435 | A | 5/2009 |
| JP | 2010106263 | A | 5/2010 |
| JP | 2017061595 | A | 3/2017 |
| RU | 2648675 | C2 | 3/2018 |
| WO | 9212182 | A1 | 7/1992 |
| WO | 9414856 | A1 | 7/1994 |
| WO | 9512622 | A1 | 5/1995 |
| WO | 9924477 | A1 | 5/1999 |
| WO | 9924478 | A1 | 5/1999 |
| WO | 9924479 | A1 | 5/1999 |
| WO | 0068315 | A1 | 11/2000 |
| WO | 200202576 | | 1/2002 |
| WO | 2004000899 | A1 | 12/2003 |
| WO | 2004111095 | A1 | 12/2004 |
| WO | 2006097497 | A1 | 9/2006 |
| WO | 2007116034 | A1 | 10/2007 |
| WO | 2008078839 | A1 | 7/2008 |
| WO | 2011076780 | A1 | 6/2011 |
| WO | 2012001052 | A3 | 3/2012 |
| WO | 2012084961 | A1 | 6/2012 |
| WO | 2011135004 | A3 | 10/2012 |
| WO | 2013007650 | A1 | 1/2013 |
| WO | 2015158790 | A2 | 10/2015 |
| WO | 2018122134 | A1 | 7/2018 |
| WO | 2019179959 | A1 | 9/2019 |

OTHER PUBLICATIONS

Office Action with English translation for Russian Patent Application No. 2022127988/04dated Jun. 16, 2023, 19 pages.
Search Report with English translation for Russian Patent Application No. 2022127988/04 dated Jun. 15, 2023, 4 pages.
Office Action with English Translation for Japanese Patent Application No. 2022-568747 dated Feb. 6, 2024, 7 pages.
Notification of Transmittal of the International Search Report and Written Opinion for PCT/EP2021/062996 mailed Jul. 33, 2021, 13 pages.
Extended European Search Report for Application No. 20175665.7 mailed Oct. 15, 2020, 7 pages.
"Thermal Desorption Analysis of Organic Emissions for the Characterization of Non-Metallic Metals for Automobiles", VDA Association of the Automotive Industry E.V., 278, Oct. 2011, 47 pages.
Zweifel, et al., "Plastic Additives Handbook", 6th edition, Hanser Publications, 2009 pp. 1141 to 1190.

(Continued)

*Primary Examiner* — Alicia Bland
(74) *Attorney, Agent, or Firm* — Lowenstein Sandler LLP

(57) ABSTRACT

Fiber reinforced composite comprising a polypropylene with high melting temperature and narrow molecular weight distribution.

20 Claims, No Drawings

(56) References Cited

OTHER PUBLICATIONS

Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
Resconi, et al., "Selectivity in Propene Polymerization with Metallocene Catalysts," Chem. Rev., 2000, vol. 100, pp. 1253-1345.
Singh, et al., "Triad Sequence Determination of Ethylene-Propylene Copolymers—Application of Quantitative 13C NMR," Polymer Testing, 2009, vol. 29, pp. 475-479.
Notice of Allowance for Korean Patent Application No. 10-2022-7042995 dated May 16, 2025, 1 page.
Zezin A.B., High-molecular compounds. Textbook and workshop for academic baccalaureate. Yurait, 2016, 340 pp.
Alkhovik M.V. Thermoplastic composition using recycled polyurethane. New technologies for recycling production and consumption waste: materials of the reports of the International Scientific and Technical Conf. Minsk: BSTU. 2016, 112-115 pp.
Dikun A. V. et al. Development of a polymer composite material based on immiscible PU. Minsk: BSTU. 2017, pp. 52-55.
Dietmar Salaberger, "Micro-structure of discontinuous fibre polymer maxtrix composites determined by X-ray Computed Tomography " Dissertation, Technishe Universitat Wien, Nov. 3, 2019 69 pages.

* cited by examiner

GLASS FIBER COMPOSITE

CROSS-REFERENCE TO RELATED APPLICATION(S)

The present application is a national stage entry under 35 U.S.C. § 371 of International Application No. PCT/EP2021/062996, filed on May 17, 2021, which claims priority to European Patent Application No. 20176022.0, filed on May 22, 2020. The contents of these applications are hereby incorporated by reference in their entirety.

The present invention is directed to a fiber reinforced composite comprising a polypropylene and glass fibers, to the manufacture of said fiber reinforced composite as well as to articles comprising said fiber reinforced composite.

Polypropylene is a material used in a wide variety of technical fields, and reinforced polypropylenes have in particular gained relevance in fields previously exclusively relying on non-polymeric materials, in particular metals. One particular example of reinforced polypropylenes are glass fibre reinforced polypropylene composites. Such materials enable tailoring of the properties of the composites by selecting the type of polypropylene, the amount of glass fibre and sometimes by selecting the type of compatibilizer used.

Accordingly, nowadays glass fibre reinforced polypropylene composites are a well-established materials for applications requiring high stiffness, heat deflection resistance and impact resistance (examples include automotive components with a load-bearing function in the engine compartment, support parts for polymer body panels, washing machine and dishwasher components). However, one drawback of the commercial available fibre reinforced polypropylene composites is their rather high emission caused by rather high amount of oligomers obtained as side product in the polymerization process.

Accordingly, there is the need of glass fibre reinforced polypropylene composites being stiff and having rather high heat deflection resistance paired with low emissions.

The finding of the present invention is that the fibre reinforced polypropylene composite must comprise a polypropylene having low molecular weight distribution and rather high melting temperature. Preferably, the polypropylene has not been visbroken, i.e. not modified in a radical-induced process to reduce the molecular weight.

Accordingly, the present invention is directed to a fiber reinforced polypropylene composite comprising (a) 59 to 90 wt.-%, based on the fiber reinforced composite, of a polypropylene, (b) 9.0 to 40 wt.-%, based on the fiber reinforced composite, of glass fibers, and (c) 0.05 to 5.0 wt.-%, based on the fiber reinforced composite, of a compatibilizer, wherein further the total amount of the polypropylene, the glass fibers and the compatibilizer in the fiber reinforced composite is at least 95 wt.-%, wherein still further the polypropylene has (i) a melting temperature Tm determined by DSC according to ISO 11357-3 (heating and cooling rate 10° C./min) in the range of 152 to 160° C., (ii) a comonomer content determined by $^{13}$C-NMR spectroscopy of not more than 0.5 wt.-%, the comonomer being ethylene, (iii) a molecular weight distribution (MWD) determined by gel permeation chromatography (GPC) in the range of 1.0 to below 4.0, and (iv) 2,1 regio-defects determined by $^{13}$C-NMR spectroscopy in the range of 0.10 to 0.90%.

The present invention is especially directed to a fiber reinforced polypropylene composite consists of (a) 59 to 90 wt.-%, based on the fiber reinforced composite, of a propylene homopolymer, (b) 9.0 to 40 wt.-%, based on the fiber reinforced composite, of glass fibers, (c) 0.05 to 5.0 wt.-%, based on the fiber reinforced composite, of a compatibilizer, and (d) 0.1 to 5.0 wt.-%, based on the fiber reinforced composite, of additives, wherein further the propylene homopolymer has (i) a melting temperature Tm determined by DSC according to ISO 11357-3 (heating and cooling rate 10° C./min) in the range of 152 to 160° C., (ii) a comonomer content determined by $^{13}$C-NMR spectroscopy of not more than 0.5 wt.-%, the comonomer being ethylene, (iii) a molecular weight distribution (MWD) determined by gel permeation chromatography (GPC) in the range of 1.0 to below 4.0, and (iv) 2,1 regio-defects determined by $^{13}$C-NMR spectroscopy in the range of 0.10 to 0.90%.

Preferred embodiments of the fiber reinforced composite are defined in the dependent claims of the invention.

The present invention is further directed to a process for the manufacture of the fiber reinforced composite as defined in the present invention comprising the steps of adding (a) the polypropylene, (b) the glass fibers, (c) the compatibilizer, and (d) optinally additives to an extruder and extruding the same by obtaining said fiber reinforced composite.

Preferably the polypropylene according to this invention is obtained by polymerizing propylene and optionally ethylene, more preferably only propylene, in the presence of the metallocene catalyst having the formula (I)

(I)

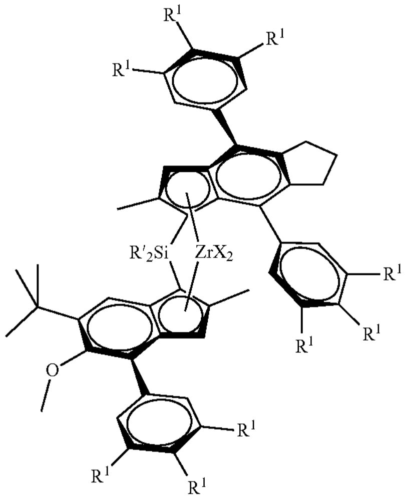

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Further the invention is directed to an article, preferably automotive article, comprising at least 90 wt.-% of the fiber reinforced composite according to the present invention.

In the following, the invention is described in more detail.

The Fiber Reinforced Composite

The present invention is directed to a fiber reinforced composite comprising a polypropylene, glass fibers and a compatibilizer. The fiber reinforced composite is understood as known in the art. That is, the polypropylene forms the continuous phase in which the glass fibers are embedded. In case the glass fibers are short glass fibers, said fibers are dispersed in the polypropylene wherein the polypropylene acts as the continuous phase. The compatibilizer improves the adhesion between the non-polar polypropylene and the polar glass fibers.

Accordingly, the present invention is directed to a fiber reinforced polypropylene composite comprising (a) 59 to 90 wt.-%, based on the fiber reinforced composite, of a polypropylene, (b) 9.0 to 40 wt.-%, based on the fiber reinforced composite, of glass fibers, and (c) 0.05 to 5.0 wt.-%, based on the fiber reinforced composite, of a compatibilizer, wherein further the total amount of the polypropylene, the glass fibers and the compatibilizer in the fiber reinforced composite is at least 95 wt.-%, preferably at least 98 wt.-%.

Beside the three components typical additives may be present which for instance are added to enhance the lifetime of the polypropylene, i.e. antioxidants (see definition of additives below).

Thus in a preferred embodiment the fiber reinforced composite according to this invention preferably comprises (a) 59 to 90 wt.-%, based on the fiber reinforced composite, of a polypropylene, (b) 9.0 to 40 wt.-%, based on the fiber reinforced composite, of glass fibers, (c) 0.05 to 5.0 wt.-%, based on the fiber reinforced composite, of a compatibilizer, and (d) 0.1 to 5.0 wt.-%, based on the fiber reinforced composite, of additives, wherein further the total amount of the polypropylene, the glass fibers, the compatibilizer and the additives in the fiber reinforced composite is at least 98 wt.-%, preferably in the range of 98 to 100 wt.-%, like in the range of 99 to 100 wt.-%.

The fiber reinforced composition preferably does not contain an elastomeric polymer. An elastomeric polymer is understood as a polymer which does not form a continuous phase within the polypropylene. In other words, an elastomeric polymer is dispersed in the polypropylene, i.e. forms inclusion in the polypropylene. A polymer containing an elastomeric polymer as inclusions as a second phase would by contrast be called heterophasic and is preferably not part of the present invention. The presence of second phases or the so-called inclusions are for instance visible by high resolution microscopy, like electron microscopy or atomic force microscopy, or by dynamic mechanical thermal analysis (DMTA). Specifically in DMTA the presence of a multiphase structure can be identified by the presence of at least two distinct glass transition temperatures.

Therefore, in a specific embodiment the fiber reinforced composite according to this invention preferably consists of (a) 59 to 90 wt.-%, based on the fiber reinforced composite, of a polypropylene, (b) 9.0 to 40 wt.-%, based on the fiber reinforced composite, of glass fibers, (c) 0.05 to 5.0 wt.-%, based on the fiber reinforced composite, of a compatibilizer, and (d) 0.1 to 5.0 wt.-%, based on the fiber reinforced composite, of additives.

The fiber reinforced composite according to this invention is especially featured by low emissions. Accordingly it is preferred that the fiber reinforced composite has a VOC (volatile organic compounds) value determined according to VDA 278 October 2011 of below 12 μg/g, more preferably in the range of 0.5 to 10 μg/g, still more preferably in the range of 0.8 to 8.0 μg/g.

Additionally or alternatively to the requirement of the previous paragraph the fiber reinforced composite has FOG (low volatility or condensable organic compounds) value determined according to VDA 278 October 2011 of below 75 μg/g, more preferably in the range of 10 to 70 μg/g, still more preferably in the range of 15 to 65 μg/g.

It is further preferred that the fiber reinforced composite has a tensile modulus as determined on injection molded specimens according to ISO 527-1 at 1 mm/min in the range of 3500 to 7000 MPa, more preferably in the range of 3800 to 6500 MPa, like in the range of 4000 to 63000 MPa. Also, the fiber reinforced composite preferably has an extension at break in the same tensile test of more than 2.0%, more preferably in the range of 2.1 to 10.0%, like in the range of 2.2 to 8.0%.

Additionally or alternatively to the requirement of the previous paragraph the fiber reinforced composite has an impact Charpy impact strength determined according to ISO 179-1eU at 23° C. in the range of 30.0 to 75.0 kJ/$m^2$, more preferably in the range of 35.0 to 70.0 kJ/$m^2$, like in the range of 40.0 to 65.0 kJ/$m^2$ In a very specific embodiment the fiber reinforced composite has a heat deflection temperature HDT measured in accordance with ISO 75 B at a load of 0.46 MPa in the range from 146 to 160° C., more preferably in the range of 148 to 158° C., like in the range of 150 to 156° C.

The Polypropylene

The essential component of the present invention is the polypropylene, which needs to be carefully selected to reach the desired properties. Accordingly, the polypropylene according to this invention needs a specific melting temperature and a rather narrow molecular weight distribution (MWD).

Further, the polypropylene according to this invention has been produced in the presence of a specific metallocene catalyst as defined in more detail below. In contrast to polypropylenes produced in the presence of Ziegler-Natta catalysts, polypropylenes produced in the presence of metallocene catalysts are characterized by misinsertions of monomer units during the polymerization process. Therefore the polypropylene according to this invention has a certain amount of 2,1-regio defects. That is the polypropylene according to this invention has 2,1 regio-defects in the range of 0.10 to 0.90%, more preferably in the range of 0.15 to 0.80%, determined by $^{13}$C-NMR spectroscopy.

Accordingly, the polypropylene according to this invention has (i) a melting temperature Tm determined by DSC according to ISO 11357-3 (heating and cooling rate 10° C./min) in the range of 152 to 160° C., (ii) a comonomer content determined by $^{13}$C-NMR spectroscopy of not more than 0.5 wt.-%, the comonomer being ethylene, (iii) a molecular weight distribution (MWD) determined by gel permeation chromatography (GPC) in the range of 1.0 to below 4.0, and (iv) 2,1 regio-defects determined by $^{13}$C-NMR spectroscopy in the range of 0.10 to 0.90%.

More preferably, the polypropylene according to this invention has (i) a melting temperature Tm determined by DSC according to ISO 11357-3 (heating and cooling rate 10° C./min) in the range of 153 to 159° C., (ii) a comonomer content determined by $^{13}$C-NMR spectroscopy of not more than 0.5 wt.-%, the comonomer being ethylene, (iii) a molecular weight distribution (MWD) determined by gel permeation chromatography (GPC) in the range of 1.6 to below 3.8, and (iv) 2,1 regio-defects determined by $^{13}$C-NMR spectroscopy in the range of 0.15 to 0.80%.

It is especially preferred that the polypropylene is monophasic, i.e. does not comprise polymer components which are not miscible with each other as it is the case for heterophasic propylene copolymers. As stated above, in contrast to monophasic systems heterophasic systems comprise a continuous polymer phase, like a polypropylene, in which a further non-miscible polymer, like an elastomeric polymer, is dispersed as inclusions. Said polypropylene systems containing a polypropylene matrix and inclusions as a second polymer phase would by contrast be called heterophasic and is preferably not part of the present invention. The presence of second polymer phases or the so called inclusions are for instance visible by high resolution microscopy, like electron microscopy or atomic force microscopy, or by dynamic mechanical thermal analysis (DMTA). Specifically in DMTA, the presence of a multiphase structure can be identified by the presence of at least two distinct glass transition temperatures.

Therefore the polypropylene according to this invention is preferably a monophasic polypropylene having a (i) a melting temperature Tm determined by DSC according to ISO 11357-3 (heating and cooling rate 10° C./min) in the range of 152 to 160° C., (ii) a comonomer content determined by $^{13}$C-NMR spectroscopy of not more than 0.5 wt.-%, the comonomer being ethylene, (iii) a molecular weight distribution (MWD) determined by gel permeation chromatography (GPC) in the range of 1.0 to below 4.0, and (iv) 2,1 regio-defects determined by $^{13}$C-NMR spectroscopy in the range of 0.10 to 0.90%.

Yet more preferably the polypropylene according to this invention is a monophasic polypropylene having a (i) a melting temperature Tm determined by DSC according to ISO 11357-3 (heating and cooling rate 10° C./min) in the range of 153 to 159° C., (ii) a comonomer content determined by $^{13}$C-NMR spectroscopy of not more than 0.5 wt.-%, the comonomer being ethylene, and (iii) a molecular weight distribution (MWD) determined by gel permeation chromatography (GPC) in the range of 1.6 to below 3.8, and (iv) 2,1 regio-defects determined by $^{13}$C-NMR spectroscopy in the range of 0.15 to 0.80%.

It is especially preferred that the monophasic polypropylene is a propylene homopolymer. A propylene homopolymer cannot be per definition heterophasic as it just contains polymer chains of propylene. In other words a propylene homopolymer according to this invention is always a monophasic polymer.

Therefore it is preferred that the monophasic polypropylene of this invention is a propylene homopolymer having (i) a melting temperature Tm determined by DSC according to ISO 11357-3 (heating and cooling rate 10° C./min) in the range of 152 to 160° C., (ii) a molecular weight distribution (MWD) determined by gel permeation chromatography (GPC) in the range of 1.0 to below 4.0, and (iii) 2,1 regio-defects determined by $^{13}$C-NMR spectroscopy in the range of 0.10 to 0.90%.

Still more preferably the monophasic polypropylene is a propylene homopolymer having (i) a melting temperature Tm determined by DSC according to ISO 11357-3 (heating and cooling rate 10° C./min) in the range of 153 to 159° C., (ii) a molecular weight distribution (MWD) determined by gel permeation chromatography (GPC) in the range of 1.6 to below 3.8, and (iii) 2,1 regio-defects determined by $^{13}$C-NMR spectroscopy in the range of 0.15 to 0.80%.

As mentioned above, it is especially preferred that the monophasic polypropylene is a propylene homopolymer. Accordingly, the monophasic polypropylene being a propylene homopolymer has (i) a melting temperature Tm determined by DSC according to ISO 11357-3 (heating and cooling rate 10° C./min) in the range of 152 to 160° C., (ii) 2,1 regio-defects in the range of 0.10 to 0.90% determined by $^{13}$C-NMR spectroscopy, and (iii) a molecular weight distribution (MWD) determined by gel permeation chromatography (GPC) in the range of 1.0 to below 4.0.

Still more preferably the monophasic polypropylene is a propylene homopolymer having (i) a melting temperature Tm determined by DSC according to ISO 11357-3 (heating and cooling rate 10° C./min) in the range of 153 to 159° C., (ii) 2,1 regio-defects in the range of 0.15 to 0.80%, determined by $^{13}$C-NMR spectroscopy, and (iii) a molecular weight distribution (MWD) determined by gel permeation chromatography (GPC) in the range of 1.6 to below 3.8.

The polypropylene according to this invention is further preferably characterized by a very low xylene cold soluble (XCS) content, which cannot be reached by Ziegler-Natta catalysts. Thus in a preferred embodiment the polypropylene, more preferably the monophasic polypropylene, according to this invention has a xylene cold soluble (XCS) fraction measured according to ISO 16152 (25° C.) in the range of 0.05 to 1.00 wt.-%, more preferably in the range of 0.10 to 0.90 wt.-%, like in the range of 0.15 to 0.85 wt.-%.

Accordingly, it is preferred that (a) the polypropylene, more preferably the monophasic polypropylene, has (i) a melting temperature Tm determined by DSC according to ISO 11357-3 (heating and cooling rate 10° C./min) in the range of 152 to 160° C.,
(ii) a comonomer content determined by $^{13}$C-NMR spectroscopy of not more than 0.5 wt.-%, the comonomer being ethylene,
(iii) a xylene cold soluble (XCS) fraction measured according to ISO 16152 (25° C.) in the range of 0.05 to 1.00 wt.-%, and
(iv) a molecular weight distribution (MWD) determined by gel permeation chromatography (GPC) in the range of 1.0 to below 4.0, or (b) the polypropylene, more preferably the monophasic polypropylene, has
(i) a melting temperature Tm determined by DSC according to ISO 11357-3 (heating and cooling rate 10° C./min) in the range of 152 to 160° C.,
(ii) a comonomer content determined by $^{13}$C-NMR spectroscopy of not more than 0.5 wt.-%, the comonomer being ethylene,
(iii) 2,1 regio-defects in the range of 0.10 to 0.90% determined by $^{13}$C-NMR spectroscopy,
(iv) a xylene cold soluble (XCS) fraction measured according to ISO 16152 (25° C.) in the range of 0.05 to 1.00 wt.-%, and
(v) a molecular weight distribution (MWD) determined by gel permeation chromatography (GPC) in the range of 1.0 to below 4.0.

Still more preferably (a) the polypropylene, preferably the monophasic polypropylene, according to this invention has
(i) a melting temperature Tm determined by DSC according to ISO 11357-3 (heating and cooling rate 10° C./min) in the range of 153 to 159° C.,
(ii) a comonomer content determined by $^{13}$C-NMR spectroscopy of not more than 0.5 wt.-%, the comonomer being ethylene,
(iii) a xylene cold soluble (XCS) fraction measured according to ISO 16152 (25° C.) in the range of 0.05 to 1.00 wt.-%, and
(iv) a molecular weight distribution (MWD) determined by gel permeation chromatography (GPC) in the range of 1.6 to below 3.8, or (b) the polypropylene, preferably the monophasic polypropylene, according to this invention has
(i) a melting temperature Tm determined by DSC according to ISO 11357-3 (heating and cooling rate 10° C./min) in the range of 153 to 159° C.,
(ii) a comonomer content determined by $^{13}$C-NMR spectroscopy of not more than 0.5 wt.-%, the comonomer being ethylene,
(iii) 2,1 regio-defects in the range of 0.15 to 0.80% determined by $^{13}$C-NMR spectroscopy,
(iv) a xylene cold soluble (XCS) fraction measured according to ISO 16152 (25° C.) in the range of 0.05 to 1.00 wt.-%, and
(v) a molecular weight distribution (MWD) determined by gel permeation chromatography (GPC) in the range of 1.6 to below 3.8.

As mentioned above, it is especially preferred that the monophasic polypropylene is a propylene homopolymer. Accordingly, the monophasic polypropylene being a propylene homopolymer has (i) a melting temperature Tm determined by DSC according to ISO 11357-3 (heating and cooling rate 10° C./min) in the range of 152 to 160° C.,
(ii) a xylene cold soluble (XCS) fraction measured according to ISO 16152 (25° C.) in the range of 0.10 to 0.90 wt.-%, and
(iii) a molecular weight distribution (MWD) determined by gel permeation chromatography (GPC) in the range of 1.0 to below 4.0.

Still more preferably, the propylene homopolymer has (i) a melting temperature Tm determined by DSC according to ISO 11357-3 (heating and cooling rate 10° C./min) in the range of 152 to 160° C.,
(ii) 2,1 regio-defects in the range of 0.10 to 0.90% determined by $^{13}$C-NMR spectroscopy,
(iii) a xylene cold soluble (XCS) fraction measured according to ISO 16152 (25° C.) in the range of 0.10 to 0.90 wt.-%, and
(iv) a molecular weight distribution (MWD) determined by gel permeation chromatography (GPC) in the range of 1.0 to below 4.0.

In a very preferred embodiment the present invention is directed to a propylene homopolymer having (i) a melting temperature Tm determined by DSC according to ISO 11357-3 (heating and cooling rate 10° C./min) in the range of 153 to 159° C.,
(ii) a xylene cold soluble (XCS) fraction measured according to ISO 16152 (25° C.) in the range of 0.10 to 0.90 wt.-%, and
(iii) a molecular weight distribution (MWD) determined by gel permeation chromatography (GPC) in the range of 1.6 to below 3.8.

Accordingly it is in particular preferred that the propylene homopolymer has (i) a melting temperature Tm determined by DSC according to ISO 11357-3 (heating and cooling rate 10° C./min) in the range of 153 to 159° C.,
(ii) 2,1 regio-defects in the range of 0.15 to 0.80% determined by $^{13}$C-NMR spectroscopy,
(iii) a xylene cold soluble (XCS) fraction measured according to ISO 16152 (25° C.) in the range of 0.10 to 0.90 wt.-%, and
(iv) a molecular weight distribution (MWD) determined by gel permeation chromatography (GPC) in the range of 1.6 to below 3.8.

In addition, it is preferred that the polypropylene of the present invention has a certain molecular weight. Accordingly it is preferred that the polypropylene according to this invention has a melt flow rate $MFR_2$ (230° C., 2.16 kg) measured according to ISO 1133 in the range of 5.0 to 500 g/10 min, preferably in the range of 5.5 to 300 g/10 min, more preferably in the range of 6.0 to 250 g/10 min.

It is therefore preferred that the polypropylene, more preferably the monophasic polypropylene, has (i) a melting temperature Tm determined by DSC according to ISO 11357-3 (heating and cooling rate 10° C./min) in the range of 152 to 160° C.,
(ii) a comonomer content determined by $^{13}$C-NMR spectroscopy of not more than 0.5 wt.-%, the comonomer being ethylene,
(iii) a xylene cold soluble (XCS) fraction measured according to ISO 16152 (25° C.) in the range of 0.05 to 1.00 wt.-%,
(iv) a melt flow rate $MFR_2$ (230° C., 2.16 kg) measured according to ISO 1133 in in the range of 5.0 to 500 g/10 min, and
(v) a molecular weight distribution (MWD) determined by gel permeation chromatography (GPC) in the range of 1.0 to below 4.0.

In a specific embodiment, the polypropylene, preferably the monophasic polypropylene, according to this invention has (i) a melting temperature Tm determined by DSC according to ISO 11357-3 (heating and cooling rate 10° C./min) in the range of 153 to 159° C., (ii) a comonomer content determined by $^{13}C$-NMR spectroscopy of not more than 0.5 wt.-%, the comonomer being ethylene, (iii) 2,1 regio-defects in the range of 0.15 to 0.80% determined by $^{13}C$-NMR spectroscopy, (iv) a xylene cold soluble (XCS) fraction measured according to ISO 16152 (25° C.) in the range of 0.05 to 1.00 wt.-%, (v) a melt flow rate $MFR_2$ (230° C., 2.16 kg) measured according to ISO 1133 in in the range of 5.0 to 500 g/10 min, and (vi) a molecular weight distribution (MWD) determined by gel permeation chromatography (GPC) in the range of 1.6 to below 3.8.

As mentioned above, it is especially preferred that the monophasic polypropylene is a propylene homopolymer. Accordingly, it is preferred that the monophasic polypropylene being a propylene homopolymer has (i) a melting temperature Tm determined by DSC according to ISO 11357-3 (heating and cooling rate 10° C./min) in the range of 153 to 159° C., (ii) a xylene cold soluble (XCS) fraction measured according to ISO 16152 (25° C.) in the range of 0.10 to 0.90 wt.-%, (iii) a melt flow rate $MFR_2$ (230° C., 2.16 kg) measured according to ISO 1133 in in the range of 5.0 to 500 g/10 min, and (iv) a molecular weight distribution (MWD) determined by gel permeation chromatography (GPC) in the range of 1.6 to below 3.8.

Accordingly it is in particular preferred that the propylene homopolymer has (i) a melting temperature Tm determined by DSC according to ISO 11357-3 (heating and cooling rate 10° C./min) in the range of 153 to 159° C., (ii) 2,1 regio-defects in the range of 0.15 to 0.80% determined by $^{13}C$-NMR spectroscopy, (iii) a xylene cold soluble (XCS) fraction measured according to ISO 16152 (25° C.) in the range of 0.10 to 0.90 wt.-%, (iv) a melt flow rate $MFR_2$ (230° C., 2.16 kg) measured according to ISO 1133 in in the range of 5.0 to 500 g/10 min, and (v) a molecular weight distribution (MWD) determined by gel permeation chromatography (GPC) in the range of 1.6 to below 3.8.

As mentioned above it is preferred that the polypropylene of this invention is produced by a specific metallocene catalyst. Accordingly, in a preferred embodiment the polypropylene, more preferably the monophasic polypropylene is produced by polymerizing propylene and optionally ethylene in the presence of the metallocene catalyst having the formula (I)

(I)

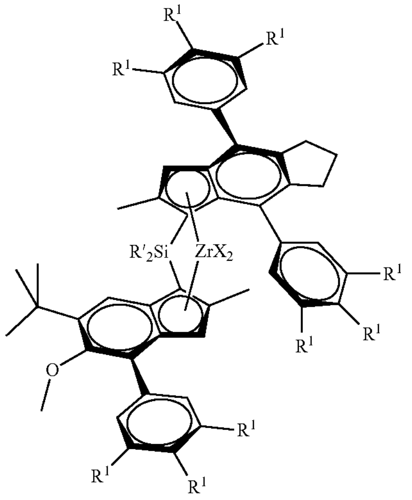

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

In the following the term "formula (I)" stands for the metallocene catalyst as defined in the previous paragraph.

Hence it is especially preferred that the polypropylene, more preferably the monophasic polypropylene, has (i) a melting temperature Tm determined by DSC according to ISO 11357-3 (heating and cooling rate 10° C./min) in the range of 152 to 160° C., (ii) a comonomer content determined by $^{13}C$-NMR spectroscopy of not more than 0.5 wt.-%, the comonomer being ethylene, (iii) 2,1 regio-defects in the range of 0.10 to 0.90% determined by $^{13}C$-NMR spectroscopy, (iv) a xylene cold soluble (XCS) fraction measured according to ISO 16152 (25° C.) in the range of 0.05 to 1.00 wt.-%, (v) a melt flow rate $MFR_2$ (230° C., 2.16 kg) measured according to ISO 1133 in in the range of 5.0 to 500 g/10 min, and (vi) a molecular weight distribution (MWD) determined by gel permeation chromatography (GPC) in the range of 1.0 to below 4.0, wherein the polypropylene, more preferably the monophasic polypropylene, is produced by polymerizing propylene and optionally ethylene in the presence of the metallocene catalyst having the formula (I) as defined above.

Still more preferably the polypropylene, preferably the monophasic polypropylene, according to this invention has (i) a melting temperature Tm determined by DSC according to ISO 11357-3 (heating and cooling rate 10° C./min) in the range of 153 to 159° C., (ii) a comonomer content determined by $^{13}C$-NMR spectroscopy of not more than 0.5 wt.-%, the comonomer being ethylene, (iii) 2,1 regio-defects in the range of 0.15 to 0.80% determined by $^{13}C$-NMR spectroscopy, (iv) a xylene cold soluble (XCS) fraction measured according to ISO 16152 (25° C.) in the range of 0.05 to 1.00 wt.-%, (v) a melt flow rate $MFR_2$ (230° C., 2.16 kg) measured according to ISO 1133 in in the range of 5.0 to 500 g/10 min, and (vi) a molecular weight distribution (MWD) determined by gel permeation chromatography (GPC) in the range of 1.6 to below 3.8, wherein the polypropylene, more preferably the monophasic polypropylene, is produced by polymerizing propylene and optionally ethylene in the presence of the metallocene catalyst having the formula (I) as defined above.

In a specific preferred embodiment the monophasic polypropylene is a propylene homopolymer. Accordingly it is preferred that the propylene homopolymer has (i) a melting temperature Tm determined by DSC according to ISO 11357-3 (heating and cooling rate 10° C./min) in the range of 153 to 159° C., (ii) 2,1 regio-defects in the range of 0.15 to 0.80% determined by $^{13}C$-NMR spectroscopy, (iii) a xylene cold soluble (XCS) fraction measured according to ISO 16152 (25° C.) in the range of 0.10 to 0.90 wt.-%, (iv) a melt flow rate $MFR_2$ (230° C., 2.16 kg) measured according to ISO 1133 in in the range of 5.0 to 500 g/10 min, and (v) a molecular weight distribution (MWD) determined by gel permeation chromatography (GPC) in the range of 1.6 to below 3.8, wherein the propylene homopolymer is produced by polymerizing propylene in the presence of the metallocene catalyst having the formula (I) as defined above.

Additionally it is preferred that the polypropylene has not been visbroken. Visbreaking, or controlled degradation by a radical-induced process initiated by peroxides or other radical generators, is normally used to enhance the melt flow rate and thus to lower the molecular weight and to narrow the molecular weight distribution. However degradation, i.e. visbreaking, of a polymer is obtained by the use of peroxides. Visbreaking as well as the use of peroxides may enhance the emission values (in terms of VOC or FOG) due to undesired side reaction leading to an increased amount of oligomers. Further, the presence of peroxides may lead to an undesired discoloration of the polypropylene. In other words, whether a polypropylene has been visbroken can be identified by the decomposition products of the peroxides or other radical generators, and by discoloration of the polypropylene. In the following whenever the term "non-visbreaking" or "non-visbroken" is used it is therefore understood that the melt flow rate, the molecular weight and the molecular weight distribution of the polypropylene has not been altered by chemical or physical treatment and further that the polypropylene is free of decomposition products of peroxides or other radical generators.

Accordingly it is preferred that the polypropylene has not been visbroken and has (i) a melting temperature Tm determined by DSC according to ISO 11357-3 (heating and cooling rate 10° C./min) in the range of 152 to 160° C., (ii) a comonomer content determined by $^{13}C$-NMR spectroscopy of not more than 0.5 wt.-%, the comonomer being ethylene, (iii) 2,1 regio-defects in the range of 0.10 to 0.90% determined by $^{13}C$-NMR spectroscopy, (iv) a xylene cold soluble (XCS) fraction measured according to ISO 16152 (25° C.) in the range of 0.05 to 1.00 wt.-%, (v) a melt flow rate $MFR_2$ (230° C., 2.16 kg) measured according to ISO 1133 in in the range of 5.0 to 500 g/10 min, and (vi) a molecular weight distribution (MWD) determined by gel permeation chromatography (GPC) in the range of 1.0 to below 4.0, wherein optionally the polypropylene is produced by polymerizing propylene and optionally ethylene in the presence of the metallocene catalyst having the formula (I) as defined above.

Still more preferably the polypropylene of the previous paragraph is a non-visbroken monophasic polypropylene.

Still yet more preferably the monophasic polypropylene according to this invention is a non-visbroken monophasic polypropylene having (i) a melting temperature Tm determined by DSC according to ISO 11357-3 (heating and cooling rate 10° C./min) in the range of 153 to 159° C., (ii) a comonomer content determined by $^{13}C$-NMR spectroscopy of not more than 0.5 wt.-%, the comonomer being ethylene, (iii) 2,1 regio-defects in the range of 0.15 to 0.80% determined by $^{13}C$-NMR spectroscopy, (iv) a xylene cold soluble (XCS) fraction measured according to ISO 16152 (25° C.) in the range of 0.05 to 1.00 wt.-%, (v) a melt flow rate $MFR_2$ (230° C., 2.16 kg) measured according to ISO 1133 in in the range of 5.0 to 500 g/10 min, and (vi) a molecular weight distribution (MWD) determined by gel permeation chromatography (GPC) in the range of 1.6 to below 3.8, wherein the non-visbroken monophasic polypropylene is produced by polymerizing propylene and optionally ethylene in the presence of the metallocene catalyst having the formula (I) as defined above.

More preferably the monophasic polypropylene according to this invention is a non-visbroken propylene homopolymer. Accordingly it is preferred that the non-visbroken propylene homopolymer according to this invention has (i) a melting temperature Tm determined by DSC according to ISO 11357-3 (heating and cooling rate 10° C./min) in the range of 153 to 159° C., (ii) 2,1 regio-defects in the range of 0.15 to 0.80% determined by $^{13}C$-NMR spectroscopy, (iii) a xylene cold soluble (XCS) fraction measured according to ISO 16152 (25° C.) in the range of 0.10 to 0.90 wt.-%, (iv) a melt flow rate $MFR_2$ (230° C., 2.16 kg) measured according to ISO 1133 in in the range of 5.0 to 500 g/10 min, and (v) a molecular weight distribution (MWD) determined by gel permeation chromatography (GPC) in the range of 1.6 to below 3.8, wherein optionally the non-visbroken propylene homopolymer was produced by polymerizing propylene in the presence of the metallocene catalyst having the formula (I) as defined above.

In the following the polymerization of the polypropylene is described in detail.

The polypropylene according to this invention can be produced in one reactor or in a reactor cascade of two or more reactors, preferably two reactors. The polymerization processes suitable for producing the polypropylene according to this invention are known in the state of the art. They comprise at least one polymerization stage, where polymerization is typically carried out in solution, slurry, bulk or gas phase. Typically, the polymerization process comprises additional polymerization stages or reactors. In one particular embodiment, the process contains at least one bulk reactor zone and optionally at least one gas phase reactor zone, each zone comprising at least one reactor and all reactors being arranged in cascade. In one particularly preferred embodiment, the polymerization process comprises at least one bulk reactor and optionally at least one gas phase reactor arranged in that order. The process may further comprise pre- and post-reactors. Pre-reactors comprise typically pre-polymerization reactors. In this kind of processes, the use of higher polymerization temperatures is preferred in order to achieve specific properties of the polymer. Typical temperatures in these processes are 70° C. or higher, preferably 75° C. or higher. The higher polymerization temperatures as mentioned above can be applied in some or all reactors of the reactor cascade.

A preferred multistage process is a "loop-gas phase"-process, such as developed by *Borealis* (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

As mentioned above the polypropylene according to this invention is especially obtained in a polymerization process using a metallocene catalyst having the formula (I)

(I)

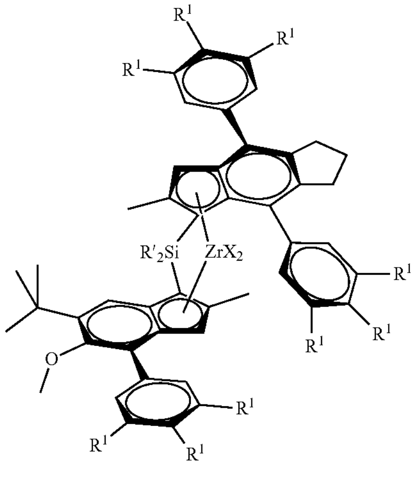

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Specific preferred metallocene catalysts of the invention include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl-phenyl)-5-methoxy-6-tert-butylinden-1-yl]zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-dimethylphenyl)-5-methoxy-6-tert-butylinden-1-yl]zirconium dichloride rac-anti-dimethylsilanediyl[2-methyl-4,8-bis-(3',5'-dimethylphenyl)-1,5,6,7-tetrahydro-s-indacen-1-yl][2-methyl-4-(3',5'-ditert-butyl-phenyl)-5-methoxy-6-tert-butylinden-1-yl]zirconium dichloride or their corresponding zirconium dimethyl analogues.

The most preferred catalyst is rac-anti-dimethylsilanediyl [2-methyl-4,8-bis-(3',5'-dimethylphenyl)-1,5,6,7-tetrahydros-indacen-1-yl][2-methyl-4-(3',5'-dimethylphenyl)-5-methoxy-6-tert-butylinden-1-yl]zirconium dichloride (II)

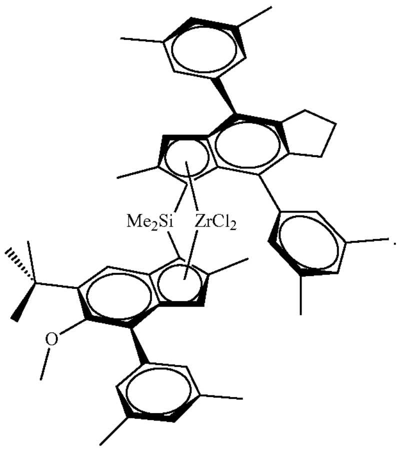

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO 2002/02576, WO 2011/135004, WO 2012/084961, WO 2012/001052, WO 2011/076780, WO 2015/158790 and WO 2018/122134. Especially reference is made to WO 2019/179959 in which the most preferred catalyst of the present invention is described. The examples section also provides the skilled person with sufficient direction.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (III):

(III)

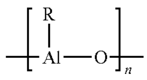

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (III).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the skilled man that where boron based cocatalysts are employed, it is normal to pre-alkylate the complex by reaction thereof with an aluminium alkyl compound, such as TIBA. This procedure is well known and any suitable aluminium alkyl, e.g. $Al(C_1$-$C_6$ $alkyl)_3$. can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (IV)

$$BY_3 \quad (IV)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl)phenyl. Preferred options are trifluoroborane, triphenylborane, tris(4-fluorophenyl)borane, tris(3,5-difluorophenyl)borane, tris(4-fluoromethylphenyl)borane, tris(2,4,6-trifluorophenyl)borane, tris(penta-fluorophenyl)borane, tris(tolyl)borane, tris(3,5-dimethyl-phenyl)borane, tris(3,5-difluorophenyl)borane and/or tris(3,4,5-trifluorophenyl)borane.

Particular preference is given to tris(pentafluorophenyl)borane.

However it is preferred that borates are used, i.e. compounds containing a borate 3+ ion. Such ionic cocatalysts preferably contain a non-coordinating anion such as tetrakis(pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:

triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylcyclohexylammoniumtetrakis(pentafluorophenyl)borate or
N,N-dimethylbenzylammoniumtetrakis(pentafluorophenyl)borate.

It has been surprisingly found that certain boron cocatalysts are especially preferred.

Preferred borates of use in the invention therefore comprise the trityl ion. Thus the use of N,N-dimethylammonium-tetrakispentafluorophenylborate and Ph3CB(PhF5)4 and analogues therefore are especially favoured.

According to the present invention, the preferred cocatalysts are alumoxanes, more preferably methylalumoxanes, combinations of alumoxanes with Al-alkyls, boron or borate cocatalysts, and combination of alumoxanes with boron-based cocatalysts.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (*Borealis*) and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The Glass Fibers

The second mandatory composition in the fiber reinforced composite are the glass fibers. The glass fibers can be any type of glass fibers like long glass fibers or short glass fibers. However it is especially preferred that the glass fibers are short glass fibers, also known as cut glass fibers or chopped glass strands.

The short glass fibers used in the fiber reinforced composite preferably have an average fiber length in the range of from 2.0 to 10.0 mm, more preferably in the range of 2.0 to 8.0 mm, still more preferably in the range of 2.0 to 5.0 mm.

It is further preferred that the short glass fibers used in the fiber reinforced composite preferably have an average diameter of from 5 to 20 μm, more preferably from 8 to 18 μm, still more preferably 8 to 15 μm.

Preferably, the short glass fibers have an aspect ratio, defined as the ratio between average fiber length and average fiber diameter, of 150 to 600, preferably of 200 to 500, more preferably 250 to 400. The aspect ratio is the relation between average length and average diameter of the fibers.

The Compatibilizer

A further component present in the fiber reinforced composite is the competibilizer or also called coupling agent or adhesion promotor. As mentioned above the compatibilizer improves the adhesion between the non-polar polypropylene and the polar glass fibers.

The compatibilizer according to this invention is preferably a polar modified polypropylene. The polar modified polypropylene, like a polar modified propylene homopolymer or a polar modified copolymer, are highly compatible with the polypropylene of the fiber reinforced composite according to this invention.

In terms of structure, the polar modified polypropylenes are preferably selected from graft or block copolymers.

In this context, preference is given to polar modified polypropylenes containing groups deriving from polar compounds, in particular selected from the group consisting of acid anhydrides, carboxylic acids, carboxylic acid derivatives, primary and secondary amines, hydroxyl compounds, oxazoline and epoxides, and also ionic compounds.

Specific examples of the said polar compounds are unsaturated cyclic anhydrides and their aliphatic diesters, and the diacid derivatives. In particular, one can use maleic anhydride and compounds selected from $C_1$ to $C_{10}$ linear and branched dialkyl maleates, $C_1$ to $C_{10}$ linear and branched dialkyl fumarates, itaconic anhydride, $C_1$ to $C_{10}$ linear and branched itaconic acid dialkyl esters, maleic acid, fumaric acid, itaconic acid and mixtures thereof.

In a particular preferred embodiment of the present invention, the polar modified polypropylene is maleic anhydride grafted polypropylene, wherein the polypropylene is either a propylene-ethylene copolymer or a propylene homopolymer. It is especially preferred that the polar modified polypropylene is maleic anhydride grafted polypropylene, wherein the polypropylene is a propylene homopolymer.

The polar modified polypropylene, especially the maleic anhydride grafted polypropylene, can be produced in a simple manner by reactive extrusion of the polypropylene, for example with maleic anhydride in the presence of free radical generators (like organic peroxides), as disclosed for instance in EP 0 572 028.

The amounts of groups deriving from polar compounds, like the amount of maleic anydride, in the polar modified polypropylene, are from 0.1 to 5.0 wt. %, preferably from 0.5 to 4.0 wt. %, and more preferably from 0.5 to 3.0 wt. %.

Preferably the polar modified polypropylene, like the maleic anhydride grafted polypropylene, has a melt flow rate $MFR_2$ (190° C., 2.16 kg) measured according to ISO 1133 of at least 50 g/10 min, more preferably of at least 80 g/10 min, yet more preferably in the range of 50 to 500 g/10 min, still yet more preferably in the range of 80 to 250 g/10 min.

The Additives

Fiber reinforced composite according to this invention may in addition comprise additives. Typical additives are acid scavengers, antioxidants, colorants, light stabilizers, slip agents, anti-scratch agents, dispersing agents, processing aids, lubricants, pigments, and the like.

Such additives are commercially available and for example described in “Plastic Additives Handbook”, 6th edition 2009 of Hans Zweifel (pages 1141 to 1190).

Additives are typically provided in form of a masterbatch. A masterbatch is a composition in which an additive or an additive mixture in rather high amount is dispersed in a polymer. Accordingly, the term “additive” according to the present invention also includes carrier materials, in particular polymeric carrier materials, in which the “active additive” or “active additive mixture” is dispersed.

The Process for Producing the Reinforced Fiber Composite

The reinforced fiber composite is produced as well known in the art. Accordingly the fiber reinforced composite is manufactured by a processes comprising the steps of adding (a) the polypropylene, (b) the glass fibers, (c) the compatibilizer, and (d) optionally additives to an extruder and extruding the same by obtaining said fiber reinforced composite, wherein preferably the polypropylene has been produced by polymerizing propylene and optionally ethylene in the presence of the metallocene catalyst having the formula (I), preferably having the formula (II).

For the extruding, i.e. melt blending, the individual components of the composite a conventional compounding or blending apparatus, e.g. a Banbury mixer, a 2-roll rubber mill, Buss-co-kneader or a twin screw extruder may be used. The fiber reinforced composite recovered from the extruder/mixer is usually in the form of granules. These granules are then preferably further processed, e.g. by injection molding to generate articles and products of the inventive composite.

It is especially preferred that the fiber reinforced composite according to the present invention is prepared by melt blending the individual components in an extruder, preferably a twin screw extruder.

In particular, it is preferred that the fiber reinforced composite according to the present invention is obtained by a process comprising the steps of (a) feeding the polypropylene, the compatibilizer and optionally the additives into an extruder, preferably a twin screw extruder,
(b) melt-kneading the composition obtained in step (a) at a temperature of 200 to 270° C.,
(c) feeding the (short) glass fibers into the extruder, preferably twin screw extruder, containing the composition obtained in step (b), and
(d) melt-kneading the composition obtained in step (c) at a temperature of 200 to 270° C., thereby obtaining the fiber reinforced composite, wherein preferably the polypropylene has been produced by polymerizing propylene and optionally ethylene in the presence of the metallocene catalyst having the formula (I), preferably having the formula (II).

The Articles

The present invention is further directed to an article, preferably an automotive article, comprising at least 90 wt.-%, more preferably at least 95 wt.-%, yet more preferably consist, of the fiber reinforced composite according to the present invention.

Especially preferred are automotive articles are dashboards and dashboard supports, bumper supports, load-bearing components of doors and tailgates, under-the-hood components like ventilators and battery carriers, and underbody protection elements.

ESPECIALLY PREFERRED EMBODIMENTS

Based on the information provided above the present invention is especially directed to the following embodiments.

Thus in a preferred embodiment the fiber reinforced composite according to this invention comprises (a) 59 to 90 wt.-%, based on the fiber reinforced composite, of a propylene homopolymer,
(b) 9 to 40 wt.-%, based on the fiber reinforced composite, of short glass fibers,
(c) 0.05 to 5.0 wt.-%, based on the fiber reinforced composite, of a compatibilizer, and
(d) 0.1 to 5.0 wt.-%, based on the fiber reinforced composite, of additives, wherein further the total amount of the propylene homopolymer, the short glass fibers, the compatibilizer and the additives in the fiber reinforced composite is in the range of 98 to 100 wt.-%, wherein still further the propylene homopolymer has (i) a melting temperature Tm determined by DSC according to ISO 11357-3 (heating and cooling rate 10° C./min) in the range of 152 to 160° C.,
(ii) 2,1 regio-defects in the range of 0.10 to 0.90% determined by $^{13}C$-NMR spectroscopy,
(iii) a xylene cold soluble (XCS) fraction measured according to ISO 16152 (25° C.) in the range of 0.10 to 0.90 wt.-%,
(iv) a melt flow rate $MFR_2$ (230° C., 2.16 kg) measured according to ISO 1133 in in the range of 5.0 to 500 g/10 min, and
(v) a molecular weight distribution (MWD) determined by gel permeation chromatography (GPC) in the range of 1.0 to below 4.0, and preferably the propylene homopolymer has not been visbroken.

In another preferred embodiment the fiber reinforced composite according to this invention comprises (a) 59 to 90 wt.-%, based on the fiber reinforced composite, of a propylene homopolymer,
(b) 9.0 to 40 wt.-%, based on the fiber reinforced composite, of short glass fibers,
(c) 0.05 to 5.0 wt.-%, based on the fiber reinforced composite, of a compatibilizer, and
(d) 0.1 to 5.0 wt.-%, based on the fiber reinforced composite, of additives, wherein further the total amount of the propylene homopolymer, the short glass fibers, the compatibilizer and the additives in the fiber reinforced composite is in the range of 98 to 100 wt.-%, wherein still further the propylene homopolymer has (i) a melting temperature Tm determined by DSC according to ISO 11357-3 (heating and cooling rate 10° C./min) in the range of 153 to 159° C.,
(ii) 2,1 regio-defects in the range of 0.15 to 0.80% determined by $^{13}C$-NMR spectroscopy,
(iii) a xylene cold soluble (XCS) fraction measured according to ISO 16152 (25° C.) in the range of 0.10 to 0.90 wt.-%,
(iv) a melt flow rate $MFR_2$ (230° C., 2.16 kg) measured according to ISO 1133 in in the range of 5.0 to 500 g/10 min, and
(v) a molecular weight distribution (MWD) determined by gel permeation chromatography (GPC) in the range of 1.6 to below 3.8, and preferably the propylene homopolymer has not been visbroken.

In still yet another preferred embodiment the fiber reinforced composite according to this invention preferably comprises (a) 59 to 90 wt.-%, based on the fiber reinforced composite, of a propylene homopolymer,
(b) 9.0 to 40 wt.-%, based on the fiber reinforced composite, of short glass fibers,
(c) 0.05 to 5.0 wt.-%, based on the fiber reinforced composite, of a compatibilizer, and
(d) 0.1 to 5.0 wt.-%, based on the fiber reinforced composite, of additives, wherein further the total amount of the propylene homopolymer, the short glass fibers, the compatibilizer and the additives in the fiber reinforced composite is in the range of 98 to 100 wt.-%, wherein still further the propylene homopolymer has (i) a melting temperature Tm determined by DSC according to ISO 11357-3 (heating and cooling rate 10° C./min) in the range of 153 to 159° C.,
(ii) 2,1 regio-defects in the range of 0.15 to 0.80% determined by $^{13}C$-NMR spectroscopy,
(iii) a xylene cold soluble (XCS) fraction measured according to ISO 16152 (25° C.) in the range of 0.10 to 0.90 wt.-%,
(iv) a melt flow rate $MFR_2$ (230° C., 2.16 kg) measured according to ISO 1133 in in the range of 5.0 to 500 g/10 min, and
(v) a molecular weight distribution (MWD) determined by gel permeation chromatography (GPC) in the range of 1.6 to below 3.8, and preferably the propylene homopolymer has not been visbroken, wherein still yet further the short glass fibers have an average fiber length of 2.0 to 10.0 mm and an average diameter of 5 to 20 μm, and the compatibilizer is a maleic anhydride grafted polypropylene wherein the maleic anhydride grafted polypropylene has a maleic anhydride content of 0.1 to 5 wt.-%.

In the following, the present invention is described by way of examples.

EXAMPLES

1. Determination Methods

The following definitions of terms and determination methods apply for the above general description of the invention as well as to the below examples unless otherwise defined.

a) Melt Flow Rate

The melt flow rate ($MFR_2$) is determined according to ISO 1133 and is indicated in g/10 min. The $MFR_2$ of polypropylene is determined at a temperature of 230° C. and under a load of 2.16 kg.

b) Heat Deflection Temperature B (HDT B)

The Heat deflection temperature B (HDT B) was determined according to ISO 75 B at 0.45 MPa using 80×10×4 $mm^3$ test bars injection molded in line with EN ISO 1873-2.

c) Xylene Cold Soluble Fraction (XCS, Wt %) The amount of the polymer soluble in xylene is determined at 25.0° C. according to ISO 16152; $1^{th}$ edition; 2005-07-01.

d) Melting Temperature $T_m$ and Crystallization Temperature $T_c$

The melting temperature $T_m$ is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The crystallization temperature ($T_c$) is determined from the cooling step while melting temperature (Tm) and melting enthalpy (Hm) are being determined in the second heating step.

e) Tensile Modulus

Tensile modulus and elongation at break are measured according to ISO 527-2 using injection molded specimens as described in EN ISO 1873-2 (1 B dog bone shape, 4 mm thickness).

f) Charpy Impact Strength

The Charpy impact strength was measured according to ISO 179 1eU at +23° C. using injection molded bar test specimens of 80×10×4 $mm^3$ prepared in accordance with EN ISO 1873-2.

g) Quantification of Copolymer Microstructure by $^{13}C$-NMR Spectroscopy

Quantitative nuclear-magnetic resonance (NMR) spectroscopy was used to quantify the comonomer content of the polymers. Quantitative $^{13}C\{^1H\}$NMR spectra were recorded in the solution-state using a Bruker Advance III 400 NMR spectrometer operating at 400.15 and 100.62 MHz for $^1H$ and $^{13}C$ respectively. All spectra were recorded using a $^{13}C$ optimized 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate ($Cr(acac)_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra. Quantitative $^{13}C\{^1H\}$NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E=0.5(S\beta\beta+S\beta\gamma+S\beta\delta+0.5(S\alpha\beta+S\alpha\gamma))$$

Through the use of this set of sites the corresponding integral equation becomes:

$$E=0.5(I_H+I_G+0.5(I_C+I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E[\text{mol }\%]=100*fE$$

The weight percent comonomer incorporation was calculated from the mole fraction:

$$E[\text{wt }\%]=100*(fE*28.06)/((fE*28.06)+((1-fE)*42.08))$$

h) Number Average Molecular Weight (Mn), Weight Average Molecular Weight (Mw) and the Molecular Weight Distribution (Mw/Mn)

Number average molecular weight ($M_n$), weight average molecular weight ($M_w$) and the molecular weight distribution ($M_w/M_n$) were determined by Gel Permeation Chromatography (GPC) according to ISO 16014-4:2003 and ASTM D 6474-99. A PolymerChar GPC instrument, equipped with infrared (IR) detector was used with 3× Olexis and 1× Olexis Guard columns from Polymer Laboratories and 1,2,4-trichlorobenzene (TCB, stabilized with 250 mg/L 2,6-Di tert butyl-4-methyl-phenol) as solvent at 160° C. and at a constant flow rate of 1 mL/min. 200 µL of sample solution were injected per analysis. The column set was calibrated using universal calibration (according to ISO 16014-2:2003) with at least 15 narrow MWD polystyrene (PS) standards in the range of 0.5 kg/mol to 11 500 kg/mol. Mark Houwink constants for PS, PE and PP used are as described per ASTM D 6474-99. All samples were prepared by dissolving 5.0-9.0 mg of polymer in 8 mL (at 160° C.) of stabilized TCB (same as mobile phase) for 2.5 hours for PP or 3 hours for PE at max. 160° C. under continuous gentle shaking in the autosampler of the GPC instrument.

i) VOC and FOG

VOC values and FOG values were measured according to VDA 278 (October 2011; Thermal Desorption Analysis of Organic Emissions for the Characterization of Non-Metallic Materials for Automobiles, VDA Verband der Automobilindustrie) after sample preparation of injection moulding plaques according to EN ISO 19069-2:2016. These plaques were packed in aluminium-composite foils immediately after production and the foils were sealed.

According to the VDA 278 October 2011 the VOC value is defined as "the total of the readily volatile to medium volatile substances. It is calculated as toluene equivalent. The method described in this recommendation allows substances in the boiling/elution range up to n-pentacosane ($C_{25}$) to be determined and analyzed."

The FOG value is defined as "the total of substances with low volatility, which elute from the retention time of n-tetradecane (inclusive)". It is calculated as hexadecane equivalent. Substances in the boiling range of n-alkanes "$C_{14}$" to "$C_{32}$" are determined and analysed.

j) Fogging:

Fogging was measured according to DIN 75201:2011-11, method B (gravimetric method) on compression-moulded specimens (diameter 80 mm+/−1 mm, thickness <1 cm) cut out from an injection-moulded plate. With this method, the mass of fogging condensate on aluminium foil in mg is determined by means of weighing of the foil before and after the fogging test. The term "fogging" refers to a fraction of volatile substances condensed on glass parts as e.g. the windscreen of a vehicle.

k) Average Fibre Diameter

The average fibre diameter is determined according to ISO 1888:2006(E), Method B, microscope magnification of 1000.

2. Preparation of the Polypropylenes a) Preparation of the Single Site Catalyst System 1

Catalyst Complex

The following metallocene complex has been used as described in WO 2019/179959:

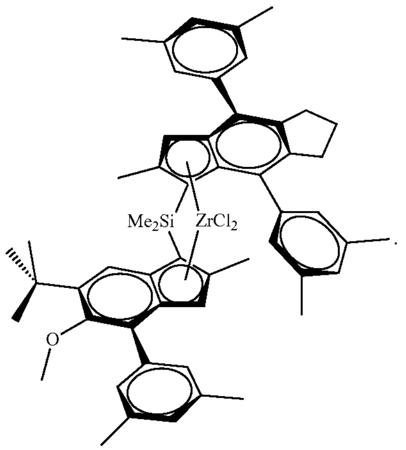

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated $SiO_2$ was dried at 600 under nitrogen flow for 2 hours and then for 5 hours under vacuum (−0.5 barg) with stirring. MAO treated support was collected as a free-flowing white powder found to contain 12.2% Al by weight.

Single Site Catalyst System 1 Preparation 30 wt.-% MAO in toluene (0.7 kg) was added into a steel nitrogen blanked reactor via a burette at 20° C. Toluene (5.4 kg) was then added under stirring. The metallocene complex as described above under 2a) (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting silution was added to a a stirred cake of MAO-silica support prepared as described above over 1 hour. The cake was allowed to stay for 12 hours, folled by drying under $N_2$ flow at 60° C. for 2 h and additionaly for 5 h under vacuum (−0.5 barg) under stirring stirring. Dried catalyst was sampled in the form of pink free flowing powder containing 13.9% Al and 0.11% Zr.

b) Preparation of the Single Site Catalyst System 2

Catalyst Complex

The following metallocene complex has been used as described in WO 2013/007650:

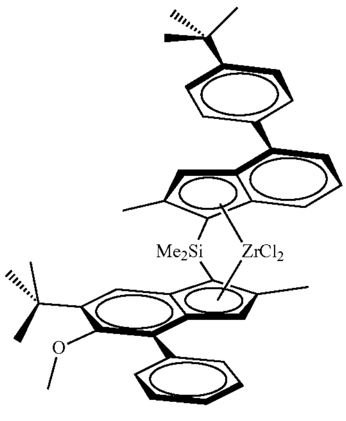

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurising with nitrogen using manual valves. Then toluene (32.2 kg) was added. The mixture was stirred (40 rpm) for 15 min. Next 30 wt % solution of MAO in toluene (17.5 kg) from Lanxess was added via 12 mm line on the top of the reactor within 70 min. The reaction mixture was then heated up to 90° C. and stirred at 90° C. for additional two hours. The slurry was allowed to settle and the mother liquor was filtered off. The MAO treated silica support was washed twice with toluene (32.2 kg) at 90° C., following by settling and filtration. The reactor was cooled off to 60° C. and the solid was washed with heptane (32.2 kg). Finally MAO treated SiO2 was dried at 60° C. for 2 h under nitrogen flow 2 kg/h, pressure 0.3 barg and then for 5 hours under vacuum (−0.5 barg) with stirring at 5 rpm. MAO treated support was collected as a free-flowing white powder found to contain 12.7% Al by weight.

Preparation of the Single Site Catalyst System 2:

In a nitrogen filled glovebox, a solution of MAO 0.25 mL (30% wt in toluene, AXION 1330 CA Lanxess) in dry toluene (1 mL) was added to an aliquot of metallocene complex as described above under 2b) (30.0 mg, 38 μmol). The mixture was stirred for 60 minutes at room temperature. Next, the solution was slowly added to 1.0 g of MAO treated silica prepared as described above, which was placed in a glass flask. The mixture was allowed to stay overnight, washed with 5 mL of toluene and was then subjected to vacuum drying for 1 hour to yield pink free-flowing powder to yield 1.1 g of the catalyst as pink free flowing powder. The catalyst system 2 has an Al content of 12.5 wt %, a Zr content of 0.248 wt % and a molar Al/Zr ratio of 170 mol/mol.

c) Preparation of the Ziegler-Natta Catalyst System 3

A Ziegler-Natta catalyst system has been used

Used Chemicals:

- 20% solution in toluene of butyl ethyl magnesium (Mg (Bu)(Et), BEM), provided by Chemtura
- 2-ethylhexanol, provided by Amphochem
- 3-Butoxy-2-propanol-(DOWANOL™ PnB), provided by Dow
- bis(2-ethylhexyl)citraconate, provided by SynphaBase
- $TiCl_4$, provided by Millenium Chemicals
- Toluene, provided by Aspokem
- Viscoplex® 1-254, provided by Evonik
- Heptane, provided by Chevron

Preparation of a Mg Alkoxy Compound

Mg alkoxide solution was prepared by adding, with stirring (70 rpm), into 11 kg of a 20 wt-% solution in toluene of butyl ethyl magnesium (Mg(Bu)(Et)), a mixture of 4.7 kg of 2-ethylhexanol and 1.2 kg of butoxypropanol in a 20 l stainless steel reactor. During the addition the reactor contents were maintained below 45° C. After addition was completed, mixing (70 rpm) of the reaction mixture was continued at 60° C. for 30 minutes. After cooling to room temperature 2.3 kg of the donor bis(2-ethylhexyl)citraconate was added to the Mg-alkoxide solution keeping temperature below 25° C. Mixing was continued for 15 minutes under stirring (70 rpm).

Preparation of Solid Catalyst Component 20.3 kg of $TiCl_4$ and 1.1 kg of toluene were added into a 20 l stainless steel reactor. Under 350 rpm mixing and keeping the temperature at 0° C., 14.5 kg of the prepared Mg alkoxy compound was added during 1.5 hours. 1.7 l of Viscoplex® 1-254 and 7.5 kg of heptane were added and after 1 hour mixing at 0° C. the temperature of the formed emulsion was raised to 90° C. within 1 hour. After 30 minutes mixing was stopped catalyst droplets were solidified and the formed catalyst particles were allowed to settle. After settling (1 hour), the supernatant liquid was siphoned away. Then the catalyst particles were washed with 45 kg of toluene at 90° C. for 20 minutes followed by two heptane washes (30 kg, 15 min). During the first heptane wash the temperature was decreased to 50° C. and during the second wash to room temperature.

The thus obtained catalyst was used along with triethylaluminium (TEAL) as co-catalyst and dicyclo pentyl dimethoxy silane (D-donor) as donor. The ratio used was:

TEAL/Ti: 250 mol/mol

TEAL/Donor: 10 mol/mol

TABLE 1

Polymerization conditions of HPP1, HPP2, HPP3 and HPP4

| | | Catalyst system | | | |
|---|---|---|---|---|---|
| | | HPP1<br>1 | HPP2<br>1 | HPP3<br>2 | HPP4<br>3 |
| Prepolymerization | | | | | |
| Temperature | [° C.] | 20 | 25 | 25 | 30 |
| Pressure | [kPa] | 5398 | 5337 | 5331 | 5450 |
| Catalyst feed | [g/h] | 2.5 | 2.5 | 4.5 | 1.8 |
| C3 feed | [kg/h] | 48 | 48 | 52 | 55 |
| H2 feed | [g/h] | 0.2 | 0.2 | 0.4 | 0.0 |
| Residence time | [h] | 0.38 | 0.37 | 0.47 | 0.30 |
| Loop (Reactor 1) | | | | | |
| Temperature | [° C.] | 75 | 75 | 75 | 75 |
| Pressure | [kPa] | 5359 | 5376 | 5279 | 5325 |
| H2/C3 ratio | [mol/kmol] | 0.16 | 0.51 | 0.3 | 7.5 |
| Residence time | [h] | 0.48 | 0.47 | 0.39 | 0.45 |
| Loop reactor split | [wt.-%] | 60 | 48 | 59 | 50 |
| $MFR_2$ | [g/10 min] | 66 | 8.0 | 14.5 | 75 |
| GPR (Reactor 2) | | | | | |
| Temperature | [° C.] | 80 | 80 | 80 | 80 |
| Pressure | [kPa] | 2400 | 2400 | 2600 | 2500 |
| H2/C3 ratio | [mol/kmol] | 3.6 | 1.5 | 2.7 | 94 |
| Polymer residence time | [h] | 2.2 | 3.0 | 3.9 | 1.9 |
| GPR reactor split | [wt.-%] | 40 | 52 | 41 | 50 |

TABLE 2

| Properties of HPP1, HPP2, HPP3 and HPP4 | | | | | |
|---|---|---|---|---|---|
| | | HPP1 | HPP2 | HPP3 | HPP4 |
| Properties | | | | | |
| Tm | [° C.] | 154 | 156 | 149 | 164 |
| MWD | [—] | 3.2 | 3.2 | 3.3 | 4.9 |
| XCS | [wt.-%] | 0.4 | 0.3 | 1.5 | 3.5 |
| $MFR_2$ | [g/10 min] | 103 | 7.0 | 9.0 | 75 |
| <2.1> defects | [%] | 0.60 | 0.60 | 0.95 | 0 |

The inventive examples IE1 and IE2 and comparative examples CE1 and CE2 were prepared by compounding on a co-rotating twin-screw extruder (ZSK 40 from Coperion) with a mixing screw typical for glass fiber compounds and an L/D ratio of 43. The following process parameters were used:

throughput of 100 kg/h screw speed of 100-150 rpm barrel temperatures of 220-250° C. increasing from the feeding zone and decreasing again towards the die plate die plate with 4 mm diameter holes and 3 strands The polypropylene and the additives different from the short glass fibers were fed to the extruder and melt-kneaded in the $2^{nd}$ barrel. A first kneading zone for mixing the polypropylene and the additives is located between the $3^{rd}$ and $5^{th}$ barrel. The short glass fibers were added in the $6^{th}$ barrel using a side feeder. A second kneading zone for glass fibre dispersion is located between the $7^{th}$ and $12^{th}$ barrel.

The composites and their properties are summarized in Table 3.

TABLE 3

| Properties of the inventive and comparative composites | | | | | |
|---|---|---|---|---|---|
| | | IE1 | IE2 | CE1 | CE2 |
| Composite | | | | | |
| HPP1 | [wt.-%] | 78 | — | — | — |
| HPP2 | [wt.-%] | — | 78 | — | — |
| HPP3 | [wt.-%] | — | — | 78 | — |
| HPP4 | [wt.-%] | — | — | — | 78 |
| Glass fibre | [wt.-%] | 20 | 20 | 20 | 20 |
| Compatibilizer | [wt.-%] | 1.5 | 1.5 | 1.5 | 1.5 |
| Additives | [wt.-%] | 0.5 | 0.5 | 0.5 | 0.5 |
| Properties | | | | | |
| Tm | [° C.] | 156 | 154 | 149 | 164 |
| $MFR_2$ | [g/10 min] | 25 | 3.2 | 4.0 | 16 |
| Tensile modulus | [MPa] | 5153 | 4977 | 4782 | 5256 |
| Elongation at break | [%] | 2.9 | 3.2 | 4.0 | 2.5 |
| Charpy Impact 23° C. | [$kJ/m^2$] | 47.8 | 50.4 | 49.3 | 48.8 |
| HDT | [° C.] | 154 | 151 | 145 | 161 |
| VOC | [μg/g] | 1 | 7 | 7 | 18 |
| FOG | [μg/g] | 57 | 42 | 73 | 196 |
| Fogging | [mg] | 0.27 | 0.30 | 0.26 | 0.46 |

As glass fibers the commercial product ECS03T-480H of Nippon Electric Glass having an average fiber length of 3.0 mm and an average diameter of 10 μm.

The following combination of additives was used in compounding: 0.2 wt % of Tris (2,4-di-t-butylphenyl) phosphite (CAS-No. 31570-04-4, commercially available as Irgafos 168 from BASF AF, Germany), 0.1 wt % of Pentaerythrityl-tetrakis(3-(3',5'-di-tert. butyl-4-hydroxyphenyl)-propionate (CAS-No. 6683-19-8, commercially available as Irganox 1010 from BASF AG, Germany) and 0.2 wt % of the carbon black masterbatch "Plasblak PPP6331" of Cabot Corporation, Germany.

Compatibilizer is the commercial maleic anhydride grafted polypropylene "Scona TPPP 8112 GA" of BYK of having a maleic anhydrid content of 1.4 wt.-% and an $MFR_2$ of more than 80 g/10 min.

The invention claimed is:

1. A fiber reinforced composite comprising:

(a) 59 to 90 wt.-% of a polypropylene, based on the fiber reinforced composite, (b) 9.0 to 40 wt.-% of glass fibers, based on the fiber reinforced composite, the glass fibers used in the fiber reinforced composite being short glass fibers having an average fiber length of 2.0 to 10.0 mm, and (c) 0.05 to 5.0 wt.-% of a compatibilizer, based on the fiber reinforced composite, wherein the total amount of the polypropylene, the short glass fibers and the compatibilizer in the fiber reinforced composite is at least 95 wt.-%, wherein the polypropylene has:

(i) a melting temperature Tm determined by DSC according to ISO 11357-3 (heating and cooling rate 10° C./min) in the range of 152 to 160° C., (ii) a comonomer content determined by $^{13}C$-NMR spectroscopy of not more than 0.5 wt.-%, the comonomer being ethylene, (iii) a molecular weight distribution (MWD) determined by gel permeation chromatography (GPC) in the range of 1.0 to below 4.0, and (iv) 2,1 regio-defects determined by $^{13}C$-NMR spectroscopy in the range of 0.10 to 0.90%, wherein the process for manufacture of the fiber reinforced composite comprises:

melt blending (a) the polypropylene, (b) the glass fibers, having an average fiber length of 2.0 to 10.0 mm, (c) the compatibilizer, and (d) optional additives in an extruder and extruding the fiber reinforced composite.

2. The fiber reinforced composite according to claim 1, wherein the polypropylene has a xylene cold soluble (XCS) fraction measured according to ISO 16152 (25° C.) in the range of 0.05 to 1.0 wt.-%.

3. The fiber reinforced composite to claim 1, wherein the polypropylene forms a continuous phase in which the fibers are embedded.

4. The fiber reinforced composite according to claim 1, wherein the polypropylene has a melt flow rate $MFR_2$ (230° C., 2.16 kg) measured according to ISO 1133 in the range of 5.0 to 500 g/10 min.

5. The fiber reinforced composite according to claim 1, wherein the polypropylene is a monophasic polypropylene.

6. The fiber reinforced composite according to claim 1, wherein the fiber reinforced composite consists of (a) 59 to 90 wt.-% of the polypropylene, based on the fiber reinforced composite, (b) 9.0 to 40 wt.-% of short glass fibers, based on the fiber reinforced composite, (c) 0.05 to 5.0 wt.-% of the compatibilizer, based on the fiber reinforced composite, and (d) 0.1 to 5.0 wt.-% of additives, based on the fiber reinforced composite.

7. The fiber reinforced composite according to claim 1, wherein the polypropylene has not been visbroken.

8. The fiber reinforced composite according to claim 5, wherein the monophasic polypropylene is a propylene homopolymer.

9. The fiber reinforced composite according to claim 8, wherein the propylene homopolymer has:
(i) a melting temperature Tm determined by DSC according to ISO 11357-3 (heating and cooling rate 10° C./min) in the range of 153 to 159° C.,
(ii) a molecular weight distribution (MWD) determined by gel permeation chromatography (GPC) in the range of 1.6 to 3.8,
(iii) a xylene cold soluble (XCS) fraction measured according to ISO 16152 (25° C.) in the range of 0.10 to 0.90 wt.-%, and
(iv) 2,1 regio-defects determined by $^{13}$C-NMR spectroscopy in the range of 0.15 to 0.80%.

10. The fiber reinforced composite according to claim 1, wherein the polypropylene has been produced by polymerizing propylene and optionally ethylene in the presence of a metallocene catalyst having the formula (I):

(I)

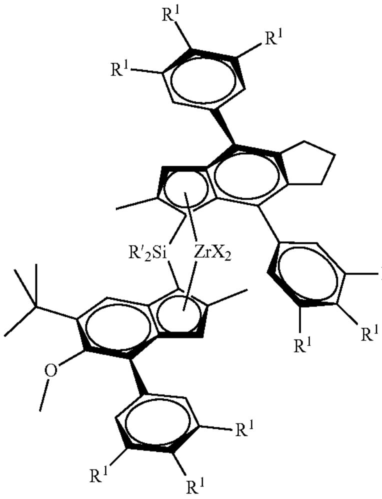

wherein each $R^1$ are independently the same or can be different and are hydrogen or a linear or branched $C_1$-$C_6$ alkyl group, wherein at least one $R^1$ per phenyl group is not hydrogen,
R' is a $C_1$-$C_{10}$ hydrocarbyl group, and
X independently is a hydrogen atom, a halogen atom, $C_1$-$C_6$ alkoxy group, $C_1$-$C_6$ alkyl group, phenyl or benzyl group.

11. The fiber reinforced composite according to claim 1, wherein the short glass fibers have an average diameter of 5 to 20 μm.

12. The fiber reinforced composite according to claim 1, wherein the compatibilizer is a maleic anhydride grafted polypropylene.

13. The fiber reinforced composite according to claim 12, wherein the maleic anhydride grafted polypropylene has a maleic anhydride content of 0.1 to 5.0 wt.-% and a melt flow rate $MFR_2$ (190° C., 2.16 kg) measured according to ISO 1133 in the range of 80 to 250 g/10 min.

14. A process for the manufacture of a fiber reinforced composite, the fiber reinforced composite comprising:
(a) 59 to 90 wt.-% of a polypropylene, based on the fiber reinforced composite,
(b) 9.0 to 40 wt.-% of glass fibers, based on the fiber reinforced composite, and
(c) 0.05 to 5.0 wt. of a compatibilizer, based on the fiber reinforced composite,
wherein the total amount of the polypropylene, the glass fibers and the compatibilizer in the fiber reinforced composite is at least 95 wt.-%,
wherein the polypropylene has been produced by polymerizing propylene in the presence of a metallocene catalysts and wherein the polypropylene has:
(i) a melting temperature Tm determined by DSC according to ISO 11357-3 (heating and cooling rate 10° C./min) in the range of 152 to 160° C.,
(ii) a comonomer content determined by $^{13}$C-NMR spectroscopy of not more than 0.5 wt.-%, the comonomer being ethylene,
(iii) a molecular weight distribution (MWD) determined by gel permeation chromatography (GPC) in the range of 1.0 to below 4.0, and
(iv) 2, 1 regio-defects determined by $^{13}$C-NMR spectroscopy in the range of 0.10 to 0.90%;
the process for the manufacture of the fiber reinforced composite comprising:
melt blending
(a) the polypropylene,
(b) the short glass fibers, having an average fiber length of 2.0 to 10.0 mm,
(c) the compatibilizer, and
(d) optionally additives
in an extruder, and
extruding the same to obtain the fiber reinforced composite.

15. An article comprising at least 90 wt.-% of the fiber reinforced composite according to claim 1.

16. The fiber reinforced composite according to claim 10, wherein R' is a $C_1$-$C_4$ hydrocarbyl group.

17. The fiber reinforced composite according to claim 10, wherein R' is a methyl group.

18. The fiber reinforced composite according to claim 14, wherein R' is a $C_1$-$C_4$ hydrocarbyl group.

19. The fiber reinforced composite according to claim 14, wherein R' is a methyl group.

20. The process according to claim 14, wherein the metallocene catalyst has the formula (I):

(I)

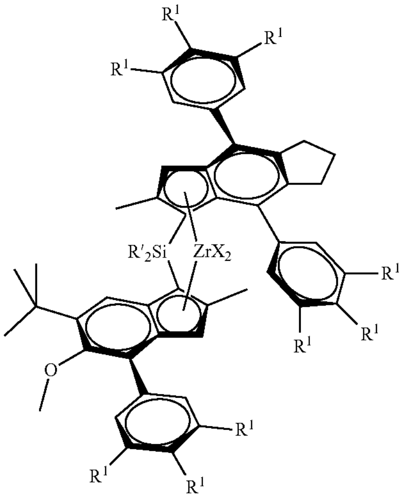

wherein each $R^1$ are independently the same or can be different and are hydrogen or a linear or branched $C_1$-$C_6$ alkyl group, wherein at least one $R^1$ per phenyl group is not hydrogen, R' is a $C_1$-$C_{10}$ hydrocarbyl group, and X independently is a hydrogen atom, a halogen atom, $C_1$-$C_6$ alkoxy group, $C_1$-$C_6$ alkyl group, phenyl or benzyl group.

* * * * *